US012660071B2

(12) United States Patent　　　　(10) Patent No.: US 12,660,071 B2
Ukai　　　　　　　　　　　　　　　　(45) Date of Patent: Jun. 16, 2026

(54) X-RAY FLUORESCENCE ANALYZER AND POWER SUPPLY DEVICE

(71) Applicant: SHIMADZU CORPORATION, Kyoto (JP)

(72) Inventor: Yohei Ukai, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 167 days.

(21) Appl. No.: 18/774,734

(22) Filed: Jul. 16, 2024

(65) Prior Publication Data

US 2025/0031293 A1　　Jan. 23, 2025

(30) Foreign Application Priority Data

Jul. 18, 2023　(JP) ................................. 2023-116947

(51) Int. Cl.
　　*H05G 1/10*　　　(2006.01)
　　*G01N 23/223*　　(2006.01)
(52) U.S. Cl.
　　CPC ............. *H05G 1/10* (2013.01); *G01N 23/223* (2013.01); *G01N 2223/076* (2013.01)

(58) Field of Classification Search
　　CPC .. H05G 1/10; H05G 1/34; H05G 1/54; G01N 23/223; G01N 2223/076; H02H 9/045; H02H 9/047; H02M 1/00; H02M 1/32
　　See application file for complete search history.

(56) References Cited

U.S. PATENT DOCUMENTS

| | | | | |
|---|---|---|---|---|
| 5,132,999 A | * | 7/1992 | Wirth ....................... | H05G 1/10 |
| | | | | 378/194 |
| 5,347,571 A | * | 9/1994 | Furbee ..................... | H05G 1/10 |
| | | | | 378/101 |

FOREIGN PATENT DOCUMENTS

WO　　　　2018/002977 A1　　1/2018

* cited by examiner

*Primary Examiner* — Uzma Alam
*Assistant Examiner* — Mamadou Faye
(74) *Attorney, Agent, or Firm* — Muir Patent Law, PLLC

(57)　　　　　　ABSTRACT

An X-ray fluorescence analyzer is provided with an X-ray tube that irradiates primary X-rays, a first power supply that supplies a filament current, a second power supply that applies a tube voltage, a first diode connected to a power line, a Zener diode connected to the ground terminal, and an operational amplifier having an inverting input terminal, and a non-inverting input terminal. The non-inverting input terminal is connected to the power line, and the output terminal is connected to the second terminal and the inverting input terminal.

7 Claims, 3 Drawing Sheets

100Z (Comparative Example)

X-RAY FLUORESCENCE ANALYZER AND POWER SUPPLY DEVICE

CROSS-REFERENCE TO RELATED APPLICATIONS

This application claims priority under 35 U.S.C. § 119 to Japanese Patent Application No. 2023-116947 filed on Jul. 18, 2023, the entire disclosure of which is incorporated herein by reference in its entirety.

BACKGROUND OF THE INVENTION

Field of the Invention

The present disclosure relates to an X-ray fluorescence analyzer and a power supply device.

Description of the Related Art

The following description sets forth the inventor's knowledge of the related art and problems therein and should not be construed as an admission of knowledge in the prior art.

Conventionally, an X-ray fluorescence analyzer for analyzing a sample by irradiating the sample with X-rays is known. International Publication No. WO 2018/002977 describes that a filament and a target, spaced apart from each other, are arranged in an X-ray tube. The analyzer described in International Publication No. WO 2018/002977 generates a tube current by applying a tube voltage between the filament and the target to produce X-rays by the collision of thermal electrons against the target.

X-rays produced by the collision of thermal electrons against the target will be referred to as "primary X-rays." A solid, powdered, or liquid sample is irradiated with primary X-rays, which cause the sample to emit fluorescent X-rays. In an analyzer using X-ray fluorescence, the qualitative or quantitative analysis of the elements contained in the sample is performed by detecting the emitted X-ray fluorescence with a spectrometer.

The analyzer described in International Publication No. WO 2018/002977 includes a tube voltage control circuit that applies a high voltage to a target and a filament current control circuit that supplies a constant current to a filament. The tube voltage control circuit performs feedback control so that the potential of the target does not deviate from the target tube voltage value.

In such an analyzer, a Zener diode may be provided as a protection circuit in the event of an unintended discharge caused by the application of a high voltage. The Zener diode protects the circuit in the analyzer by directing the discharge current to the ground terminal when a discharge above the Zener voltage occurs.

However, due to its characteristics, in a Zener diode, a leakage current called the "reverse current" occurs when a reverse voltage that is smaller than the Zener voltage is applied. For this reason, during the period when the tube voltage is applied in order to generate primary X-rays, and the tube current is flowing due to the application of the tube voltage, a leakage current occurs in the Zener diode. Since the tube current control circuit performs the feedback control using the current value after the effect of the leakage current as an input, the X-ray analyzer may experience a discrepancy between the tube current value as an input value for the feedback control and the value of the tube current actually flowing through the tube.

SUMMARY OF THE INVENTION

The preferred embodiments of the present disclosure have been developed in view of the above-mentioned and/or other problems in the related art. The preferred embodiments of the present disclosure can significantly improve upon existing methods and/or apparatuses.

The present disclosure has been made to solve the above-mentioned problems, and the purpose of the present disclosure is to suppress leakage of a tube current in a Zener diode for discharge protection in an X-ray fluorescence analyzer that generates X-rays by applying a tube voltage to a filament and a target.

An X-ray fluorescence analyzer according to one aspect of the present disclosure is provided with:

an X-ray tube including a filament and a target, the X-ray tube being configured to irradiate a sample with primary X-rays;

a detector configured to detect secondary X-rays generated from the sample;

a first power supply configured to supply a filament current to the filament via a power line;

a second power supply configured to apply a tube voltage to the target;

a first diode having a first terminal and a second terminal, the first terminal being connected to the power line;

a Zener diode having a third terminal and a fourth terminal, the third terminal being connected to the second terminal, the fourth terminal being connected to a ground terminal; and an operational amplifier having an output terminal, an inverting input terminal, and a non-inverting input terminal.

The non-inverting input terminal is connected to the power line, and the output terminal is connected to the second terminal and the inverting input terminal.

A power supply device according to another aspect of the present disclosure is a power supply device that supplies a current to an X-ray tube including a filament and a target.

The power supply device is provided with:

a first power supply configured to supply a filament current to the filament via a power line;

a second power supply configured to apply a tube voltage to the target;

a first diode having a first terminal and a second terminal, the first terminal being connected to the power line;

a Zener diode having a third terminal and a fourth terminal, the third terminal being connected to the second terminal, the fourth terminal being connected to the ground terminal; and an operational amplifier having an output terminal, an inverting input terminal, and a non-inverting input terminal.

The non-inverting input terminal is connected to the power line, and the output terminal is connected to the second terminal and the inverting input terminal.

The above and other objects, features, aspects, and advantages of the present invention will become apparent from the following detailed description of the present invention understood in connection with the accompanying drawings.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspects or features of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present disclosure are shown by way of example, and not limitation, in the accompanying figures.

DETAILED DESCRIPTION OF THE PREFERRED EMBODIMENTS

In the following paragraphs, some preferred embodiments of the present disclosure will be described by way of example and not limitation. It should be understood based on this disclosure that various other modifications can be made by those in the art based on these illustrated embodiments.

Embodiment

Hereinafter, some embodiments of the present disclosure will be described with reference to the attached drawings. Note that the same or equivalent part in the figures is assigned by the same reference symbol, and the description will not be repeated.

<Configuration of Power Supply Device and X-Ray Tube>

Figure 1:
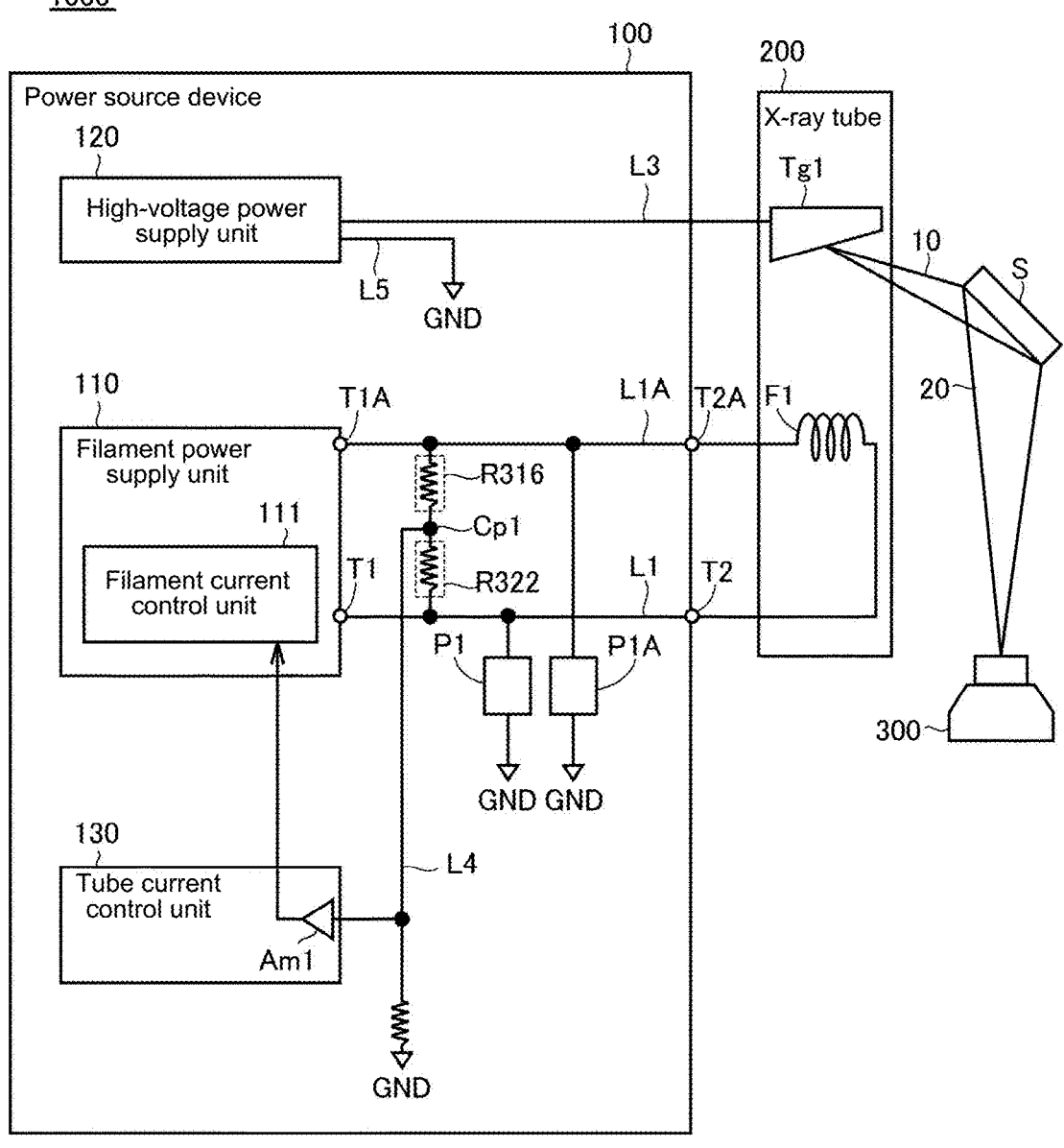
FIG. 1 is a diagram schematically showing a power supply device and an X-ray tube of an X-ray fluorescence analyzer.

FIG. 1 is a diagram schematically showing a power supply device 100 and an X-ray tube 200 of an X-ray fluorescence analyzer 1000. The X-ray fluorescence analyzer 1000 is, for example, an energy dispersive X-ray fluorescence analyzer (EDX: Energy Dispersive X-ray Fluorescence Spectrometer). In this embodiment, an example will be described in which a power supply device 100 that generates primary X-rays is applied to an X-ray fluorescence analyzer 1000.

As shown in FIG. 1, the X-ray fluorescence analyzer 1000 includes a power supply device 100, an X-ray tube 200, and a detector 300. The power supply device 100 applies a voltage to the X-ray tube 200 to generate primary X-rays 10. The primary X-rays 10 are irradiated onto the sample S. The sample S irradiated with the primary X-rays 10 emits X-ray fluorescence 20. The X-ray fluorescence 20 emitted from the sample S is referred to as "secondary X-rays" relative to primary X-rays. The detector 300 detects the X-ray fluorescence 20. With this, the X-ray fluorescence analyzer 1000 can perform the quantitative or qualitative analysis of the sample S.

The X-ray tube 200 has a target Tg1 and a filament F1. The target Tg1 is an anode, and the filament F1 is a cathode. The target Tg1 and the filament F1 are arranged with a space therebetween in the X-ray tube 200. The power supply device 100 is equipped with a filament power supply unit 110, a high voltage power supply unit 120, and a tube current control unit 130.

The filament power supply unit 110 applies a voltage to both ends of the filament F1 to heat the filament F1. In the following, the current supplied by the voltage application of the filament power supply unit 110 is referred to as "filament current." The high voltage power supply unit 120 applies a high voltage to the target Tg1 and the filament F1. Hereafter, the high voltage applied by the high voltage power supply unit 120 is referred to as "tube voltage." The tube current control unit 130 performs feedback control for adjusting the output of the filament power supply unit 110 based on the value of the current flowing through the power line L4.

In the X-ray tube 200, thermal electrons are generated by the heating of the filament F1 by the filament power supply unit 110. When a tube voltage is applied between the filament F1 and the target Tg1 by the high voltage power supply unit 120, thermionic electrons collide with the target Tg1. In this way, primary X-rays 10 are generated.

As shown in FIG. 1, the filament power supply unit 110 is connected to the filament F1 via a power line L1 and a power line L1A. The power line L1 is connected to one end of the filament F1, and the power line L1A is connected to the other end of the filament F1. The terminal T1 and the terminal T1A of the filament power supply unit 110 are connected to the power lines L1 and L1A, respectively. The terminal T2 and the terminal T2A of the power supply device 100 are connected to the filament F1. The connection point Cp1 is a connection point connecting the connection point between the terminal T1 and the terminal T2 and the connection point between the terminal T1A and the terminal T2A. A resistor R322 is connected between the connection point Cp1 and the connection point connecting the terminal T1 and the terminal T2. A resistor R316 is connected between the connection point Cp1 and the connection point connecting the terminal T1A and the terminal T2A. In one example, the resistance of the resistor R316 and that of the resistor R322 are each $100\Omega$ and their power ratings are each 0.5 W. One end of the power line L4 is connected to the connection point Cp1, and the other end of the power line L4 is connected to the ground terminal GND via a resistor.

Note that one end of the power line L4 may be connected to either the connection point of the terminals T1 and T2 or the connection point of the terminals T1A and T2A, instead of the connection point Cp1.

A protection circuit P1 is connected to the power line L1 between the terminal T1 and the terminal T2. Similarly, a protection circuit P1A is connected to the power line L1A between the terminal T1A and the terminal T2A. The protection circuits P1 and P1A each include a Zener diode as will be described later.

With this, even in cases where an unintended discharge occurs in the X-ray tube 200, the protection circuits P1 and P1A can protect the filament power supply unit 110 and the tube current control unit 130 from overvoltage caused by the discharge. Note that in the case where the control unit of the high voltage power supply unit 120 and the tube current control unit 130 are mounted on the same board, the protection circuits P1 and P1A can also protect the high voltage power supply unit 120 from overvoltage caused by the electrical discharge.

The high voltage power supply unit 120 has electrical components, such as a transformer and a rectifier, to generate a high voltage to be applied to the X-ray tube 200.

As shown in FIG. 1, the high voltage power supply unit 120 is connected to the target Tg1 via the power line L3. Further, the high voltage power supply unit 120 is connected to the ground terminal GND via the power line L5.

The filament power supply unit 110 supplies a filament current to the filament F1 of the X-ray tube 200 and regulates the tube current. The tube current control unit 130 detects the tube current flowing through the power line L4 with a resistor, converts it to a voltage, amplifies it with the amplifier Am1, and detects the value of the tube current flowing through the power line L4. The tube current control unit 130 sends the detected tube current value to the filament current control unit 111. The tube current flowing through the power line L4 returns to the high voltage power supply unit 120 from the power line L5 through a resistor and the ground terminal GND.

Note that the tube current value transmitted by the tube current control unit 130 to the filament current control unit 111 may be determined to be valid or not, based on the predetermined upper and lower limits of the filament current. Note that in the tube current control unit 130, an error amplifier may be placed on the output side of the amplifier Am1.

The filament current control unit 111 controls the output of the filament current according to the tube current value detected by the tube current control unit 130. As described above, in the X-ray fluorescence analyzer 1000 according to this embodiment, the feedback control of the filament current is performed based on the value of the tube current flowing through the power line L4. Note that the filament power supply unit 110 corresponds to the "first power supply unit" in this disclosure. The high voltage power supply unit 120 corresponds to the "second power supply unit" in this disclosure.

<Configuration of Electric Circuit>

Figure 2:
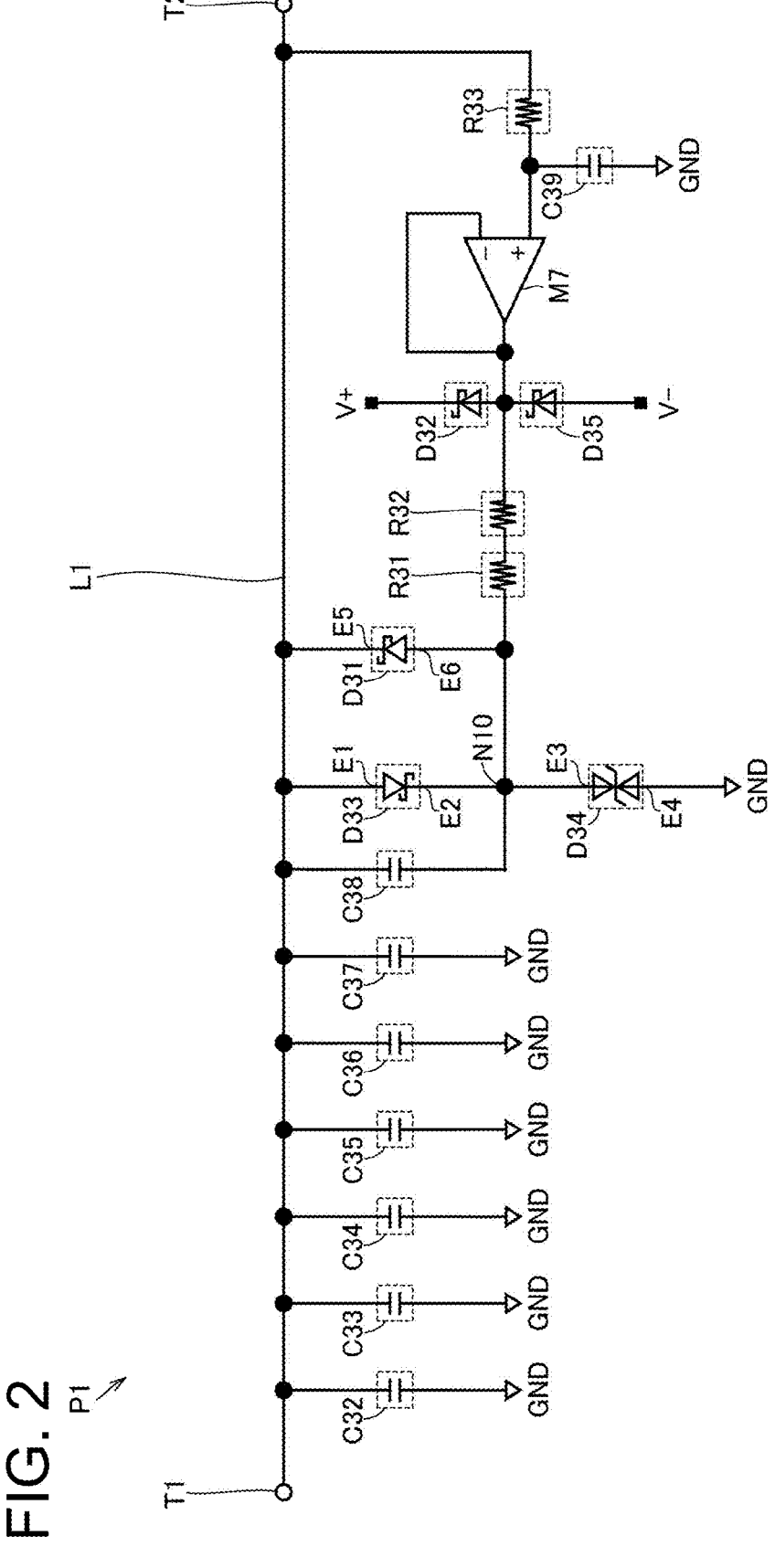
FIG. 2 is an equivalent circuit diagram of a protection circuit.

FIG. 2 is an equivalent circuit diagram of the protection circuit P1. Referring to FIG. 2, the power supply device 100 includes capacitors C32 to C39, Schottky diodes D31, D32, D33, D35, a Zener diode D34, an operational amplifier M7, and resistors R31 to R33, as the protection circuit P1 between the terminal T1 and the terminal T2. The protection circuit P1A has the same configuration as the protection circuit P1 shown in FIG. 2. For this reason, the description of the protection circuit P1A will not be repeated below.

As shown in FIG. 2, the power line L1 connects the terminal T1 and the terminal T2. One end of each of the capacitors C32 to C37 is connected to the power line L1. Further, the other end of each of the capacitors C32 to C37 is connected to the ground terminal GND. With this, in the power supply device 100, when a discharge current flows through the power line L1 due to the occurrence of an unintended high voltage discharge, the capacitors C32 to C37 can suppress the increase in voltage. In the example in FIG. 2, the number of capacitors C32 to C37 is six. Note that the total capacitance value of the capacitors C32 to C37, which are provided for the purpose of suppressing the increase in tube voltage, is preferably less than or equal to the capacitance that will not cause any effects on the control of the tube current control unit 130.

In one example, the capacitance of each of the capacitors C32 and C33 is 100 pF, and the rated voltage thereof is 100 V. The capacitance of each of the capacitors C34 and C35 is 2,200 pF, and the rated voltage thereof is 100 V. The capacitance of each of the capacitors C36 and C37 is 0.01 μF, and the rated voltage thereof is 250 V. As described above, in this embodiment, six capacitors C32 to C37 are provided for the purpose of reducing the voltage increase due to high voltage discharges. Note that each of the capacitors C32 to C37 corresponds to the "first capacitor" in this disclosure.

The power supply device 100 includes a Schottky diode D33. The Schottky diode D33 has a terminal E1 and a terminal E2. In the example in FIG. 2, the terminal E1 is an anode, and the terminal E2 is a cathode. The terminal E1 is connected to the power line L1. The terminal E2 is connected to a Zener diode D34.

Note that the Schottky diode D33 corresponds to the "first diode" in this disclosure. The terminal E1 of the Schottky diode D33 corresponds to the "first terminal" in this disclosure. The terminal E2 of the Schottky diode D33 corresponds to the "second terminal" in this disclosure.

In this embodiment, the Zener diode D34 is a bidirectional Zener diode. In other words, the Zener diode D34 is composed of two Zener diodes arranged in opposite directions. The Zener diode D34 has a terminal E3 and a terminal E4. The terminal E3 of the Zener diode D34 is connected to the terminal E2 of the Schottky diode D33. The terminal E4 is connected to the ground terminal GND. The terminal E3 of the Zener diode D34 corresponds to the "third terminal" in this disclosure. The terminal E4 of the Zener diode D34 corresponds to the "fourth terminal" in this disclosure. In this embodiment, more specifically, the Zener diode D34 is a Transient-Voltage Suppression (TVS) diode.

The power supply device 100 includes a Schottky diode D31 in addition to the Schottky diode D33. The Schottky diode D31 includes a terminal E5 and a terminal E6. In the example in FIG. 2, the terminal E5 is a cathode, and the terminal E6 is an anode. Note that the Schottky diode D31 corresponds to the "second diode" in this disclosure. The terminal E5 of the Schottky diode D31 corresponds to the "fifth terminal" in this disclosure. The terminal E6 of the Schottky diode D31 corresponds to the "sixth terminal" in this disclosure. The Schottky diodes D31 and D33 each may be another type of diode, such as a Fast Recovery Diode (FRD).

As shown in FIG. 2, in the power supply device 100, the Schottky diodes D31 and D33 are connected in parallel so that the direction of the anode and the direction of the cathode are opposite each other. In the event that an unintended discharge has occurred in the X-ray tube 200, it is not possible to determine which polarity of the discharge current flows into the power line L1. Therefore, as shown in FIG. 2, by connecting the Schottky diodes D31 and D33 in parallel with the direction of the anode and the direction of the cathode opposite to each other with respect to the power line L1, it is possible to pass the discharge current from the power line L1 to the Zener diode D34 through either one of the Schottky diodes D31 and D33, regardless of the polarity of the discharge current.

In this embodiment, the power supply device 100 includes an operational amplifier M7 for configuring a voltage follower circuit. The operational amplifier M7 has an inverting input terminal, a non-inverting input terminal, and an output terminal, and is connected between the power line L1 and the connection node N10. The connection node N10 is a connection node between the Schottky diode D33 and the Zener diode D34.

The output terminal of the operational amplifier M7 is connected to the connection node N10 via series-connected resistors R31 and R32. The non-inverting input terminal of the operational amplifier M7 is connected to the power line L1 via a resistor R33. Further, the output terminal of the operational amplifier M7 is connected to the inverting input terminal of the operational amplifier M7. The resistors R31 and R32 are provided to protect operational amplifier M7. In one example, the resistance of the resistor R31 and that of the resistor R32 are each 100Ω, and their power ratings are each 0.5 W.

A clamp circuit is formed between the resistor R32 and the output terminal of the operational amplifier M7 by the Schottky diodes D32 and D35.

Figure 3:
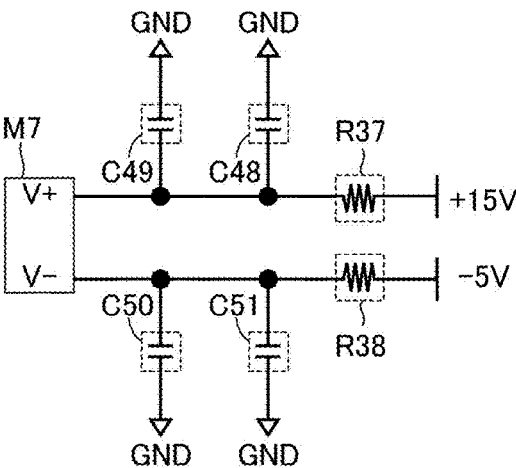
FIG. 3 is a circuit diagram for explaining a power supply of an operational amplifier.

FIG. 3 is a circuit diagram for describing the power supply for the operational amplifier M7. +15 V DC power supply is connected to the positive power supply terminal of the operational amplifier M7. −5 V DC power supply is connected to the minus power supply terminal of the operational amplifier M7. Note that the voltage values of the positive and negative power supply terminals of the operational amplifier M7 are examples and may be other voltage values.

Capacitors C48, C49, C50, C51 and resistors R37, R38 are connected to the power supply lines of the operational amplifier M7. The capacitors C48, C49, C50, and C51 are so-called bypass capacitors. In one example, the capacitance of each of the capacitors C49 and C50 is 0.1 µF, and their rated voltage is 100 V. The capacitance of each of the capacitors C48 and C51 is 4.7 µF, and their rated voltage is 50 V. The capacitors C48 to C51 and the resistors R37 and R38 are provided to reduce noise generated in the power supply line of the operational amplifier M7. Further, the capacitors C48 to C51 and the Schottky diodes D32 and D35 suppress the voltage rise of the output terminal of the operational amplifier M7 and protect the operational amplifier M7.

Returning to FIG. 2, the output terminal of the operational amplifier M7 is connected to the inverting input terminal of the operational amplifier M7, as described above. Since the operational amplifier M7 functions as a voltage follower circuit, the output voltage of the operational amplifier M7 becomes the same potential as the input voltage from the non-inverting input terminal.

As a result, the difference between the potential at the terminal E2 of the Schottky diode D33, which is connected to the output terminal of the operational amplifier M7, and the potential of the power line L1, which is connected to the input terminal of the operational amplifier M7, becomes close to zero. Similarly, the difference between the potential at the terminal E6 of the Schottky diode D31, which is connected to the output terminal of the operational amplifier M7, and the potential of the power line L1, which is connected to the input terminal of the operational amplifier M7, becomes close to zero. In the Schottky diodes D31 and D33, a current flows when there is a difference between the anode voltage and the cathode voltage. In this embodiment, the operational amplifier M7 causes the difference between the anode voltage and the cathode voltages of the Schottky diodes D31 and D33 to approach zero.

As a result, the value of the current flowing through the Schottky diodes D31 and D33 becomes close to zero during the period when the tube current is flowing due to the application of the tube voltage to generate primary X-rays without any discharge occurring.

Figure 4:
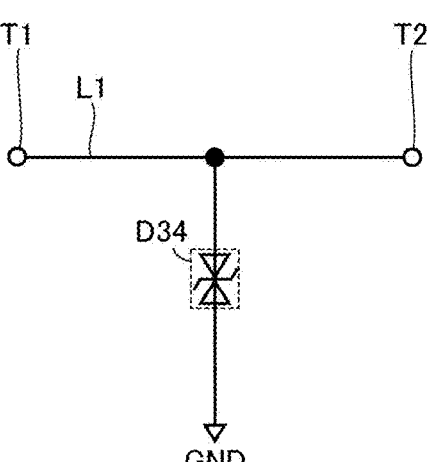
FIG. 4 is a circuit diagram showing a circuit from a terminal T1 to a terminal T2 in a power supply device according to Comparative Example.

FIG. 4 is a circuit diagram between a terminal T1 and a terminal T2 in a power supply device 100Z according to Comparative Example. In the power supply device 100Z of Comparative Example, no voltage follower circuit by the operational amplifier M7 is provided, and a Zener diode D34 is directly connected to the power line L1.

In Comparative Example, a tube voltage is applied to generate primary X-rays 10, and during the period when the tube current is flowing, a voltage lower than or equal to the operating voltage of the Zener diode D34 is continuously applied to the Zener diode D34, causing a part of the tube current flowing through the power line L1 to flow into the ground terminal GND as a leakage current. As a result, in Comparative Example, the generation of the leakage current causes a difference between the value of the tube current actually flowing through the tube and the value of the current used as the input for feedback control (the value of the current flowing through the power line L4).

On the other hand, in this power supply device 100 shown in FIG. 2, during the period when a tube voltage is applied to generate primary X-rays 10, and a tube current is flowing, the potential difference between the two terminals of the Schottky diodes D31 and D33 approaches zero by the voltage follower circuit formed by the operational amplifier M7. In other words, the value of the current flowing from the power line L1 through the Schottky diodes D31 and D33 to the Zener diode D34 approaches zero. With this, in this embodiment, it is possible to suppress the leakage of the tube current at the Zener diode D34.

The capacitor C38 is connected in parallel to the Schottky diode D33 between the power line L1 and the Zener diode D34. More specifically, one end of the capacitor C38 is connected to the power line L1, and the other end of the capacitor C38 is connected to the terminal E3 of the Zener diode D34 via the connection node N10.

As a result, in the power supply device 100, when a discharge current flows into the Schottky diodes D31 and D33 due to the occurrence of discharge, a temporary path is formed by the capacitor C38 as a path for the discharge current to flow from the power line L1 to the Zener diode D34. The discharge current basically flows through the Schottky diode D31 or the Schottky diode D33. The capacitor C38 is provided as a path for a discharge current to flow from the power line L1 to the Zener diode D34 until the Schottky diode D31 or the Schottky diode D33 conducts. Note that the capacitor C38 corresponds to the "second capacitor" in this disclosure.

<About Response Speed>

In this embodiment, the response speed of the voltage follower circuit composed of the operational amplifier M7 is adjusted within a predetermined range. When the response speed of the voltage follower circuit is too fast, even when a discharge has occurred, the voltage follower circuit will cause the potential difference between the two terminals of the Schottky diodes D31 and 33 to approach zero, making it impossible for the discharge current to flow to the Zener diode D34.

On the other hand, when the response speed of the voltage follower circuit is too slow, during the period when a tube voltage is applied to generate primary X-rays, and a tube current is flowing in a state in which no discharge is occurring, a potential difference may occur between the two terminals of the Schottky diodes D31 and D33. Specifically, when the voltage value of the power line L1 fluctuates due to a change in the current flowing through the power line L1, if the response speed of the voltage follower circuit is too slow, a potential difference will be generated at both terminals of the Schottky diodes D31 and 33 for the amount of fluctuation. This causes a tube current to flow from the Schottky diode D31 to the Zener diode D34, resulting in a tube current leakage. At this time, if the response speed of the voltage follower circuit is slower than the response speed of the feedback control of the tube current control, a discrepancy occurs between the value of the tube current as the input value of the feedback control and the value of the tube current actually flowing through the tube.

The response speed of the voltage follower circuit is preferably within a predetermined range. In this embodiment, the response speed of the voltage follower circuit is adjusted using the resistor R33 and the capacitor C39. In one example, the resistance value of the resistor R33 is 10 kΩ, and the rated power is 0.25 W. The capacitance of the capacitor C39 is 2,200 pF, and the rated voltage is 100 V.

One end of the resistor R33 is connected to the power line L1. The other end of the resistor R33 is connected to the non-inverting input terminal of the operational amplifier M7 and one end of the capacitor C39. A ground terminal is connected to the other end of the capacitor C39. The capacitor C39 and the resistor R33 function as a delay circuit.

As a result, it is possible to delay the response speed of the voltage follower circuit when the voltage value of the power line L1 fluctuates due to the changes in the current value flowing through the power line L1. In other words, according to this embodiment, the response speed of the voltage follower circuit composed of the operational amplifier M7 can be adjusted by providing the resistor R33 and the capacitor C39. Further, the capacitor C39 and the resistor R33 also serve to protect the operational amplifier M7. As described above, in this embodiment, a filter circuit that functions as a delay circuit is formed on the input side of the operational amplifier M7.

Further, in this embodiment, a filter circuit is formed also by the parasitic capacitance of the Zener diode D34 and the resistors R31 and R32. In this embodiment, the Zener diode D34 and resistors R31 and R32 are provided, so that the operational amplifier M7 can be protected. As described above, in this embodiment, the filter circuit is formed not only on the input side of the operational amplifier M7 but also on the output side.

As explained above, in this embodiment, the leakage of the tube current in the Zener diode D34 is suppressed, thereby preventing a discrepancy between the value of the tube current as the input value for the feedback control and the value of the tube current actually flowing to the tube. When the value of the tube current flowing through the power line L4 is small, the effect of the leakage current on the discrepancy between the value of the tube current as the input value for feedback control and the value of the tube current actually flowing through the tube becomes large. In this embodiment, even in the case where the effect of the leakage current becomes large due to the small tube current value, it is possible to suppress the occurrence of the tube current leakage in the Zener diode D34 itself and suppress the discrepancy between the value of the tube current as the input value for feedback control and the value of the tube current actually flowing through the tube.

Further, in this embodiment, it is possible to reduce the value of the current flowing to the Zener diode D34 through the Schottky diodes D31 and D33 to close to zero. Therefore, in this embodiment, the tube current leakage can be suppressed regardless of the characteristics of the Zener diode D34.

Further, in this embodiment, since the circuit is composed of common electronic components, such as a Zener diode, a Schottky diode, a capacitor, and an operational amplifier, the increase in cost can be suppressed. Note that it is conceivable to correct the error caused by the tube current leakage in the Zener diode by using a correction factor to correct the set value of the tube current, but this would incur the cost of developing software to calculate the correction factor. In this embodiment, the discrepancy between the value of the tube current as the input value for feedback control and the value of the tube current actually flowing to the tube can be suppressed without incurring the development cost of software to compensate for feedback control.

Further, in the power supply device 100 of this embodiment, it is possible to suppress tube current leakage regardless of the temperature fluctuation and discharge protection performance of the Zener diode D34.

In this embodiment, an example is described in which the power supply device 100 that generates X-rays is applied to an X-ray fluorescence analyzer 1000. However, the power supply device 100 that generates X-rays can be applied, for example, to a roentgen device, a CT device, or a radiography device, rather than a fluorescent X-ray analyzer. In other words, the power supply device 100 can be applied to a wide variety of devices that generate X-rays by applying a tube voltage to a filament F1 and a target Tg1.

Aspects

It would be understood by those skilled in the art that the exemplary embodiments described above are specific examples of the following aspects.
(Item 1)
An X-ray fluorescence analyzer according to one aspect of the present disclosure comprises:
    an X-ray tube including a filament and a target, the X-ray tube being configured to irradiate a sample with primary X-rays;
    a detector configured to detect secondary X-rays generated from the sample;
    a first power supply configured to supply a filament current to the filament via a power line;
    a second power supply configured to apply a tube voltage to the target;
    a first diode having a first terminal and a second terminal, the first terminal being connected to the power line;
    a Zener diode having a third terminal and a fourth terminal, the third terminal being connected to the second terminal, the fourth terminal being connected to a ground terminal; and
    an operational amplifier having an output terminal, an inverting input terminal, and a non-inverting input terminal,
    wherein the non-inverting input terminal is connected to the power line, and
    wherein the output terminal is connected to the second terminal and the inverting input terminal.
According to the X-ray fluorescence analyzer as recited in the above-described Item 1, in an X-ray fluorescence analyzer that generates X-rays by applying a tube voltage to a filament and a target, it is possible to suppress the leakage of the tube current in a Zener diode for discharge protection.
(Item 2)
In the X-ray fluorescence analyzer as recited in the above-described Item 1, it may be configured such that it further comprises:
    a second diode having a fifth terminal and a sixth terminal, the fifth terminal being connected to the power line,
    wherein the sixth terminal is connected to the third terminal and the output terminal,
    the first terminal is an anode,
    the second terminal is a cathode,
    the fifth terminal is a cathode,
    the sixth terminal is an anode, and
    the Zener diode is a bidirectional Zener diode.

According to the X-ray fluorescence analyzer 1000 as recited in the above-described Item 2, regardless of the polarity of the discharge current in either direction, it is possible to pass the discharge current from the power line to the Zener diode via one of the Schottky diodes.

(Item 3)

In the X-ray fluorescence analyzer as recited in the above-described Item 1 or 2, it may be configured such that it further comprises:

a first capacitor with one end connected to the power line and the other end connected to the ground terminal.

According to the X-ray fluorescence analyzer as recited in the above-described Item 3, when a discharge current flows through the power line due to the occurrence of an unintended high voltage discharge, the first capacitor can suppress the voltage increase.

(Item 4)

In the X-ray fluorescence analyzer as recited in any one of the above-described Items 1 to 3, it may be configured such that it further comprises:

a second capacitor connected in parallel to the first diode.

According to the X-ray fluorescence analyzer as recited in the above-described Item 4, when a discharge current flows into the Schottky diode due to the occurrence of a discharge, a temporary path can be formed by a capacitor as a path for the discharge current to flow from the power line to the Zener diode.

(Item 5)

In the X-ray fluorescence analyzer as recited in any one of the above-described Items 1 to 4, it may be configured such that it further comprises:

a filter circuit provided on at least one of the non-inverting input terminal and the output terminal.

According to the X-ray fluorescence analyzer as recited in the above-described Item 5, at least one of the resistor and the capacitor, and at least one of the Zener diode and the resistor are provided, so that the response speed of the voltage follower circuit composed of the operational amplifiers can be adjusted. With this, the voltage follower circuit is configured to not follow the voltage fluctuations in the power line.

(Item 6)

In the X-ray fluorescence analyzer as recited in any one of the above-described Items 1 to 5, it may be configured such that it further comprises:

a clamp circuit connected to the output terminal.

According to the X-ray fluorescence analyzer as recited in the above-described Item 6, the operational amplifier can be protected.

(Item 7)

A power supply device according to another aspect of the present disclosure relates to a power supply device configured to supply a current to an X-ray tube including a filament and a target.

The power supply device comprises:

a first power supply configured to supply a filament current to the filament via a power line;

a second power supply configured to apply a tube voltage to the target;

a first diode having a first terminal and a second terminal, the first terminal being connected to the power line;

a Zener diode having a third terminal and a fourth terminal, the third terminal being connected to the second terminal, the fourth terminal being connected to a ground terminal; and an operational amplifier having an output terminal, an inverting input terminal, and a non-inverting input terminal, wherein the non-inverting input terminal is connected to the power line, and wherein the output terminal is connected to the second terminal and the inverting input terminal.

According to the power supply device as recited in the above-described Item 7, in an X-ray fluorescence analyzer that generates X-rays by applying a tube voltage to a filament and a target, it is possible to suppress the leakage of the tube current in a Zener diode for discharge protection.

Although some embodiments of the present invention have been described, the embodiments disclosed here should be considered in all respects illustrative and not restrictive. It should be noted that the scope of the invention is indicated by claims and is intended to include all modifications within the meaning and scope of the claims and equivalents.

The invention claimed is:

1. An X-ray fluorescence analyzer comprising:

an X-ray tube including a filament and a target, the X-ray tube being configured to irradiate a sample with primary X-rays;

a detector configured to detect secondary X-rays generated from the sample;

a first power supply configured to supply a filament current to the filament via a power line;

a second power supply configured to apply a tube voltage to the target;

a first diode having a first terminal and a second terminal, the first terminal being connected to the power line;

a Zener diode having a third terminal and a fourth terminal, the third terminal being connected to the second terminal, the fourth terminal being connected to a ground terminal; and an operational amplifier having an output terminal, an inverting input terminal, and a non-inverting input terminal, wherein the non-inverting input terminal is connected to the power line, and wherein the output terminal is connected to the second terminal and the inverting input terminal.

2. The X-ray fluorescence analyzer as recited in claim 1, further comprising:

a second diode having a fifth terminal and a sixth terminal, the fifth terminal being connected to the power line, wherein the sixth terminal is connected to the third terminal and the output terminal, the first terminal is an anode, the second terminal is a cathode, the fifth terminal is a cathode, the sixth terminal is an anode, and the Zener diode is a bidirectional Zener diode.

3. The X-ray fluorescence analyzer as recited in claim 1, further comprising:

a first capacitor with one end connected to the power line and the other end connected to the ground terminal.

4. The X-ray fluorescence analyzer as recited in claim 1, further comprising:

a second capacitor connected in parallel to the first diode.

5. The X-ray fluorescence analyzer as recited in claim 1, further comprising:

a filter circuit provided on at least one of the non-inverting input terminal and the output terminal.

6. The X-ray fluorescence analyzer as recited in claim 1, further comprising:

a clamp circuit connected to the output terminal.

7. A power supply device configured to supply a current to an X-ray tube including a filament and a target, comprising:

a first power supply configured to supply a filament current to the filament via a power line;

a second power supply configured to apply a tube voltage to the target;

a first diode having a first terminal and a second terminal, the first terminal being connected to the power line;

a Zener diode having a third terminal and a fourth terminal, the third terminal being connected to the second terminal, the fourth terminal being connected to a ground terminal; and an operational amplifier having an output terminal, an inverting input terminal, and a non-inverting input terminal, wherein the non-inverting input terminal is connected to the power line, and wherein the output terminal is connected to the second terminal and the inverting input terminal.

* * * * *